Aug. 26, 1958     E. C. SCARBROUGH     2,848,779
HELICAL EXPANDER
Filed July 20, 1955
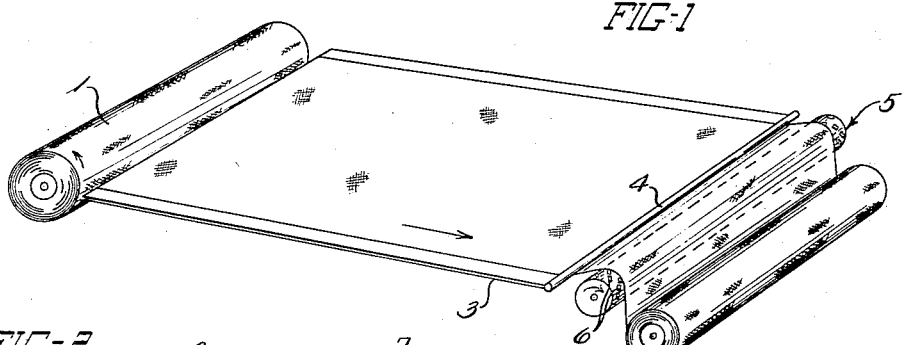
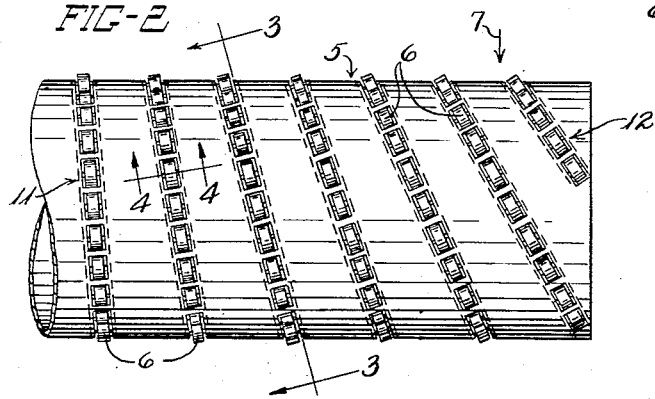
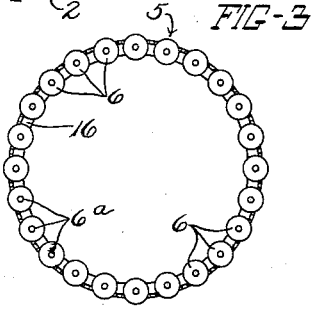
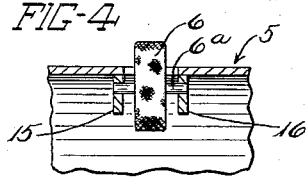
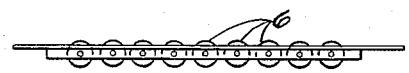
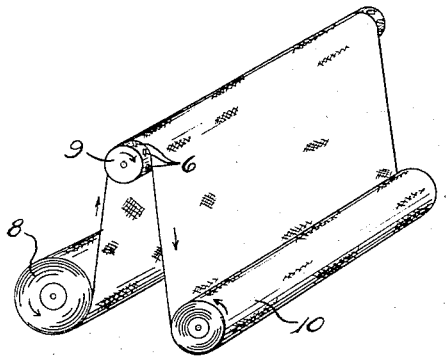
INVENTOR.
ERMA C. SCARBROUGH
BY W. A. Fraser
ATTY-

United States Patent Office 2,848,779
Patented Aug. 26, 1958

2,848,779
HELICAL EXPANDER

Erna C. Scarbrough, Barberton, Ohio, assignor to The Firestone Tire & Rubber Company, Akron, Ohio, a corporation of Ohio Application July 20, 1955, Serial No. 523,285

4 Claims. (Cl. 26—63)

This invention relates to a machine for smoothing wrinkles from a continuous strip of web material.

It is an object of this invention to provide means for eliminating wrinkles from a ply of continuous web material as much material is wound into a roll.

It is also an object of the invention to provide a machine which removes the wrinkles from a strip of continuous fabric as it is passed through a train of processing apparatus.

More particularly, it is an object of the invention to provide an expander for eliminating wrinkles from a sheet of continuous fabric liner normally used to separate the convolutions of rolls of continuous tacky rubbery sheets.

These and other objects will be more fully understood with reference to the attached specification, claims and drawing of which the following is a description:

Figure 1 is a diagrammatic perspective view of fabric processing apparatus incorporating the invention;

Figure 2 is an enlarged plan view of the bar and rollers of the invention;

Figure 3 is a sectional view taken along line 3—3 of Figure 2;

Figure 4 is an enlarged sectional view taken along line 4—4 of Figure 2;

Figure 5 is a diagrammatic view of a modification of the invention;

Figure 6 is a perspective view of a second modification of the invention.

Referring to Figure 1, a feed roll 1 of continuous web material supplies a continuous sheet which is rerolled onto roll 2 after passing across inspection table 3 and under bar 4. Such an arrangement of apparatus is usual in a rubber factory where fabric liners are used to separate the convolutions of continuous sheets of tacky rubberized fabric. The arrangement of apparatus shown in Figure 1 is designed to reroll the liner after one use into a tight, smooth, wrinkle-free roll for further use in the factory. In the form of the present invention shown in Figure 1, a round bar 5 is mounted transverse the direction of travel of the liner and provided on its face with numerous small rollers 6. Rollers 6 are journaled with axes below the surface of bar 5 but with a peripheral portion above the peripheral surface of the bar as the rollers rotate. The individual rollers so journaled, easily rotate by the frictional contact of the sheet material against the protruding peripheral portion of each roller. The peripheral surface of the roller 6 may be knurled (Figure 4) or otherwise provided for frictional engagement with the sheet material. As shown in Figure 4, roller 6 is set into bar 5 on axle 6a which is journaled in bearings 15 and 16 to permit free rotation of the roller as the fabric passes thereover.

In the preferred form of the invention, the rollers 6 are positioned in lines as shown in Figure 2. From the center of the bar 5 towards the end thereof each succeeding line of rollers diverges at an increased angle from the direction of travel of the sheet material. Consequently, the innermost line of rollers 11 diverges from the direction of travel (arrow 7) of the sheet material to a less degree than the outermost line of rollers 12 at the very end of bar 5.

By mounting the windup roll 2 below the upper peripheral surface of the expander bar 5, a snubbing action is obtained to give an increased mechanical advantage to the action of the rollers 6 against the sheet material. This arrangement of apparatus increases the efficiency of the invention in removing wrinkles from the passing sheet.

It is to be understood that roll 2 may be driven by any conventional driving device such as an electric motor and gear combination but that such is not part of the invention and need not be shown. In a like manner, let-off roller 1 may be either driven or braked as desired by a conventional arrangement of apparatus readily available and known to those skilled in the art. Expander roll 5 may be driven to vary at will the relative speed between the liner and the roll.

Figure 5 shows a modification of the invention wherein a horizontal arrangement of the rollers replaces the pipe 5 shown in Figure 1. Such an arrangement allows a broad surface of contact of the expander with the moving sheet without the presence of a large heavy bar.

The table 3 is used for inspection of the passing strip by the operator but in other modifications of the invention, this table may be eliminated and a modification adopted such as shown in Figure 6 wherein only a let-off roll 8, expanding bar 9 and a windup roll 10 are used. The expanding bar 9 is provided with journaled rollers 6 in a manner similar to the modification of the invention shown in Figure 1.

An expander of the invention may be positioned at a rubber calender to smooth liner as rubberized fabric is rolled into the convolutions thereof to reduce the damage caused by liner wrinkles. The novel expander also may be placed to smooth liner as such is passed around rubberized fabric at a tire ply bias cutter which cuts continuous lengths of fabric into strips for the manufacture of tires. The invention may be used as well with other fabric processing apparatus requiring the use of smooth continuous sheets of fabric.

The preferred modification of the invention has been shown by way of example only and other modifications may be made without departing from the inventive concept within the scope of the appended claims.

In the claims:

1. An expander for eliminating wrinkles from a sheet of continuous web material comprising an element with a curved surface having recesses over which the material is passed, rollers mounted for free rotation in said recesses with the direction of rotation diverging from the direction of travel of said web material with a segment of the peripheral surface of each roller protruding above the peripheral surface of said curved element.

2. An expander for continuous web material as in claim 1 wherein the rollers are positioned in lines diverging angularly from the direction of travel of said web material.

3. An expander for continuous web material as in claim 1 wherein the rollers are positioned in lines diverging angularly from the direction of travel of said material, each succeeding line from the center of the element having an angle of divergence from the direction of travel of said material greater than the inner next adjacent line.

4. An expander for continuous web material as in claim 1 wherein the rollers are positioned in lines diverging from the line of travel of said material.

References Cited in the file of this patent

UNITED STATES PATENTS

| 1,123,851 | Cooper | Jan. 5, 1915 |
| 1,563,704 | Greis | Dec. 1, 1925 |
| 1,950,578 | Stoica | Mar. 13, 1934 |
| 2,508,096 | Borgos | May 16, 1950 |